(12) United States Patent
Roesmann

(10) Patent No.: US 9,203,290 B2
(45) Date of Patent: Dec. 1, 2015

(54) PITCH DRIVE DEVICE FOR A WIND POWER OR HYDROELECTRIC POWER STATION

(75) Inventor: Tobias Roesmann, Dortmund (DE)

(73) Assignee: MOOG UNNA GMBH, Unna (DE)

( * ) Notice: Subject to any disclaimer, the term of this patent is extended or adjusted under 35 U.S.C. 154(b) by 592 days.

(21) Appl. No.: 13/509,926

(22) PCT Filed: Nov. 17, 2010

(86) PCT No.: PCT/EP2010/067700
§ 371 (c)(1),
(2), (4) Date: May 15, 2012

(87) PCT Pub. No.: WO2011/061233
PCT Pub. Date: May 26, 2011

(65) Prior Publication Data
US 2012/0294716 A1    Nov. 22, 2012

(30) Foreign Application Priority Data

Nov. 19, 2009  (DE) .......................... 10 2009 046 883

(51) Int. Cl.
| | |
|---|---|
| *F01D 25/00* | (2006.01) |
| *F01D 7/00* | (2006.01) |
| *H02K 23/64* | (2006.01) |
| *F03D 7/02* | (2006.01) |
| *F03D 9/00* | (2006.01) |
| *H02K 19/10* | (2006.01) |
| *H02P 4/00* | (2006.01) |
| *H02P 25/02* | (2006.01) |
| *H02K 7/18* | (2006.01) |

(52) U.S. Cl.
CPC .............. *H02K 23/64* (2013.01); *F03D 7/0224* (2013.01); *F03D 9/003* (2013.01); *H02K 19/10* (2013.01); *H02P 4/00* (2013.01); *H02P 25/021* (2013.01); *H02K 7/1838* (2013.01); *H02K 2213/09* (2013.01); *Y02E 10/721* (2013.01); *Y02E 10/723* (2013.01)

(58) Field of Classification Search
USPC ....................................................... 416/155, 1
See application file for complete search history.

(56) References Cited

U.S. PATENT DOCUMENTS

| 334,823 | A | * | 1/1886 | Tesla ............................ 310/244 |
| 382,845 | A | * | 5/1888 | Tesla ............................ 310/219 |
| 7,307,368 | B2 | * | 12/2007 | Tsurukawa et al. ........... 310/237 |
| 2004/0075352 | A1 | * | 4/2004 | Hartel et al. .................... 310/89 |
| 2006/0091841 | A1 | * | 5/2006 | Roussel ......................... 318/445 |
| 2007/0286731 | A1 | * | 12/2007 | Dantlgraber .................. 416/162 |

FOREIGN PATENT DOCUMENTS

DE   102006015511   10/2007

OTHER PUBLICATIONS http://en.wikipedia.org/wiki/Electric_motor, Internet Archive of Wikipedia article on Electric Motors, captured Dec. 17, 2008.*
International Search Report for PCT/EP2010/067700, Completed by the European Patent Office on Feb. 6, 2012, 3 Pages.

* cited by examiner

*Primary Examiner* — Igor Kershteyn
(74) *Attorney, Agent, or Firm* — Phillips Lytle LLP

(57) ABSTRACT

A pitch drive device for a wind power or hydroelectric power station having a synchronous motor and a motor operation switchover unit for switching between a normal operation and emergency operation modes. To do so, the synchronous motor is operable in normal operation with three-phase AC and in emergency operation with DC. A method for operating a pitch drive device of this type is also disclosed.

12 Claims, 12 Drawing Sheets

Figure 1:
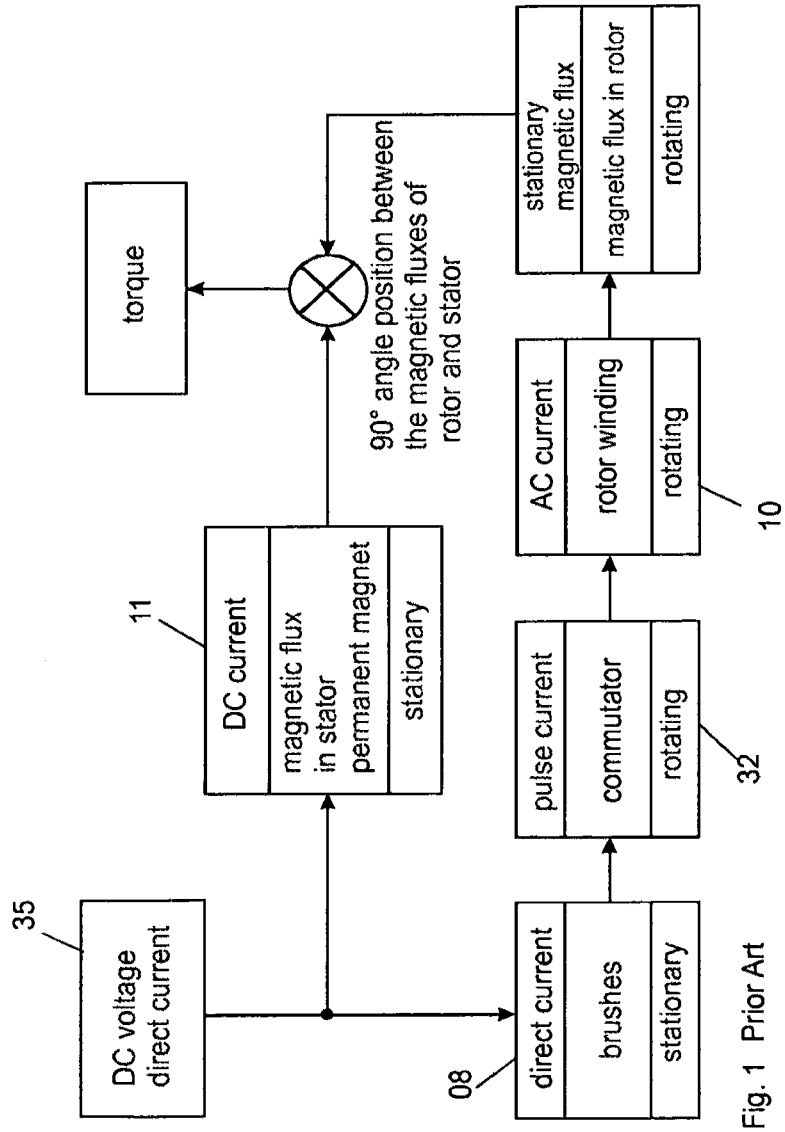

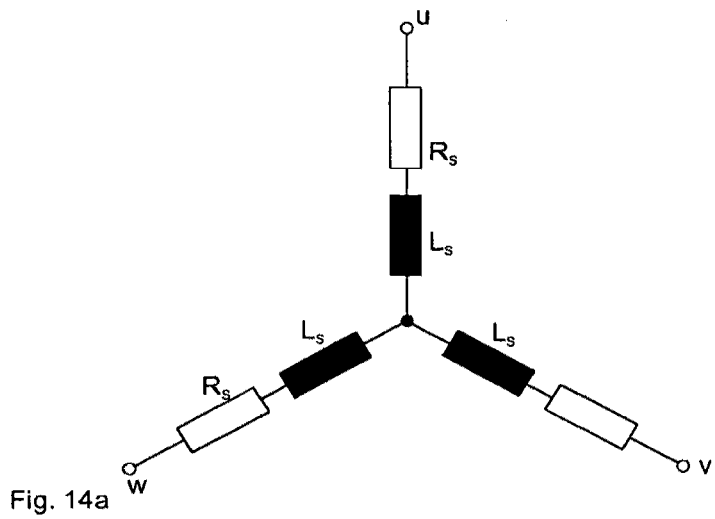
Fig. 14a
| φ | u | v | w |
|---|---|---|---|
| 0 | 0 | −0.5 | 0.5 |
| 30 | −0.333 | −0.333 | 0.667 |
| 60 | −0.5 | 0 | 0.5 |
| 90 | −0.667 | 0.333 | 0.333 |
| 120 | −0.5 | 0.5 | 0 |
| 150 | −0.333 | 0.667 | −0.333 |
| 180 | 0 | 0.5 | −0.5 |
| 210 | 0.333 | 0.333 | −0.667 |
| 240 | 0.5 | 0 | −0.5 |
| 270 | 0.667 | −0.333 | −0.333 |
| 300 | 0.5 | −0.5 | 0 |
| 330 | 0.333 | −0.667 | 0.333 |
Fig. 14b
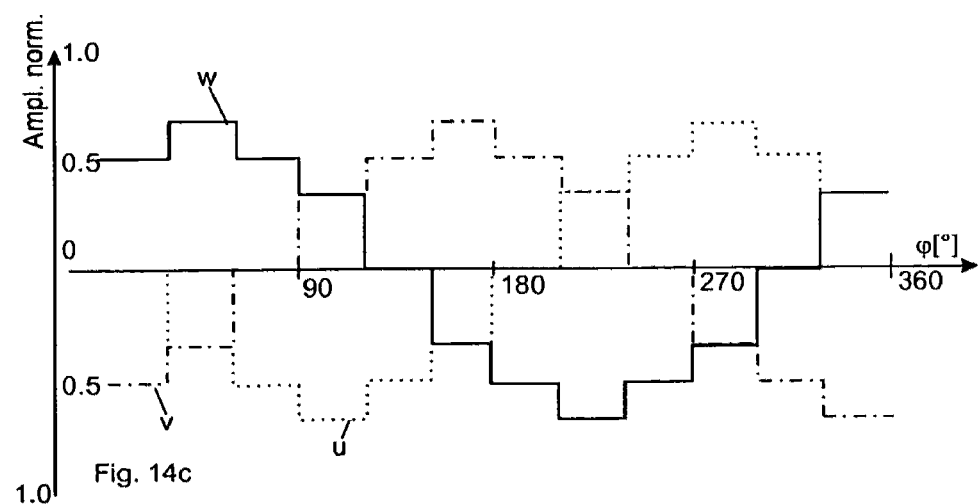
Fig. 14c

PITCH DRIVE DEVICE FOR A WIND POWER OR HYDROELECTRIC POWER STATION

CROSS-REFERENCE TO RELATED APPLICATION

This application is the U.S. national phase of PCT Appln. No. PCT/EP2010/067700 filed on Nov. 17, 2010, which claims priority to German Patent Application No. 10 2009 046 883.8 filed on Nov. 19, 2009, the disclosures of which are incorporated in their entirety by reference herein.

The invention relates to a pitch drive device for a wind power or hydroelectric power station comprising a synchronous motor and a motor operation switchover unit for switching between normal operation with AC or three-phase AC supply and emergency operation with DC supply.

The invention furthermore relates to a method for operating a pitch drive device of this type.

Pitch drives are used in wind power or hydroelectric power stations for adjusting the angle of incidence of a drive medium relative to a blade of a rotor or turbine. The drive medium is an incoming wind in the case of a wind power station and incoming water in the case of a hydroelectric power station. Thanks to the motor-powered adjustment of the pitch, i.e. of the angle of incidence of the rotor blade, the rotational speed of the energy generation plant can be set, for example to achieve the highest possible efficiency with low flows and to prevent overloading with very high flows. Rotors and turbines are usually each provided with one pitch drive per blade, however there are also centrally arranged pitch drive devices which centrally set the pitch of all or at least a majority of blades. The subject matter of the invention can be implemented in both decentrally and centrally arranged pitch drive devices.

Pitch drive devices are known from the prior art which are designed as AC or three-phase AC drives and are operated by means of an AC or three-phase AC from an AC power supply network. These devices are driven by powerful, wear-free and sturdy three-phase AC drives. AC-powered pitch drive devices of this type do however have the drawback that in the event of failure of the AC network or a fault in the motor electronics, the pitch drive will fail completely, meaning the pitch can no longer be changed and the power station can no longer be controlled. This usually happens in adverse conditions, for example in storms, where it is not infrequent that a lightning strike paralyzes the AC network or motor electronics, or that heavy rainfall causes a rise in the water quantities. There is a risk of the power station being overloaded and suffering severe or irreparable damage.

For this reason, power stations of this type usually have an emergency operation supply system which can provide a DC supply on the basis of an auxiliary energy source, usually a battery. This in turn results in the problem that an AC drive device is supplied with DC voltage in emergency operation. This problem can be solved, for example, in that a pitch drive motor designed as an AC or three-phase AC drive can be operated by supplying a direct current to an intermediate circuit of an inverter. This in turn, however, has the disadvantage that when the inverter fails, the entire pitch drive also fails.

Alternatively to this, there are design variants in which, parallel to and independently of an AC pitch drive—whether AC or 3-phase AC—a direct-current pitch drive acts on the same pitch adjustment shaft or is arranged engaging by a gear with a pitch adjustment transmission that can, in the event of emergency operation, change the rotor blade pitch although the normal operation pitch drive device remains deactivated. However, with a solution of this type two independently operating AC and DC pitch drive devices are needed which are correspondingly more complex and more expensive to manufacture and maintain.

It is known from the prior art, for example from DE 10 2006 015 511 A1, that an asynchronous motor is used as the pitch drive and in normal operation can be operated using three-phase AC with interposition of an inverter and a direct-current circuit, and is operated in the event of emergency operation also with three-phase AC, with the energy supply however being provided by a DC voltage source and the direct current being converted into three-phase AC by means of a mechanical commutator driven by a direct current motor. This variant therefore proposes operation of an asynchronous three-phase AC pitch drive where in emergency operation a DC voltage from a DC voltage source is converted into three-phase AC voltage by means of a commutator operated by an external motor and coupled to a direct current auxiliary motor. Controlling a drive device of this type is difficult, since the auxiliary motor determines the frequency of the three-phase AC regardless of the behavior of the asynchronous motor and hence affects the speed behavior of the pitch drive without reactive effect.

Proceeding from this prior art, the object of the invention is to propose a pitch drive device as compact as possible, sturdy, fail-safe and universally usable, and that even under technically difficult and unusual conditions, such as storm, lightning strike, failure of the mains voltage supply and/or damage to a converter, use the advantages of a three-phase AC pitch drive motor, but without major hardware expenditure, i.e. the lowest possible number of electrical and electronic components, and permits low-wear DC emergency operation.

It is furthermore the aim of the invention to provide a pitch drive device that affords the advantages of a synchronous motor drive, such as exact speed setting, high efficiency, low inertia, low wear, speed independent of loading, non-slip operation and easy regulation both in normal operation and in emergency operation.

This object is achieved by a pitch drive device and by an operating method in accordance with the teachings of the independent claims.

In accordance with the invention, the pitch drive device for a wind power or hydroelectric power station comprises a synchronous motor and a motor-powered switchover unit for switching between normal operation and emergency operation. To do so, the synchronous motor is operable in normal operation using AC or three-phase AC supply and in emergency operation using a DC supply.

In other words, the invention relates to a pitch drive device using a synchronous motor for adjusting the pitch of the rotor blades of a wind power or hydroelectric power turbine, where the synchronous motor can be operated in normal operation using an AC supply, i.e. AC or three-phase AC supply, for example from a public energy supply network, and where in the event of a fault, for example lightning strike, failure of the converter electronics, failure of the mains voltage supply etc., switching is possible using a motor operation switchover unit to emergency operation in which the synchronous motor is supplied with direct current. To do so, the synchronous motor must be designed such that it can both be supplied directly with AC or three-phase AC, and operated with DC without interposition of an electronic inverter. To do so, it is for example conceivable that the stator of a separately excited synchronous motor builds up with direct current a static magnetic field and the rotor is supplied with current by means of a (mechanically) switchable commutator such that a rotating rotor magnetic field is created that operates the motor. The rotor and stator windings of the synchronous motor are used as parts of a direct current motor, where a commutator ensures the necessary pole changing of the rotor windings. Depending on the wiring of rotor and stator windings, a series, shunt or compound DC motor can be provided in emergency operation. However, a motor with this type of wiring of the motor windings loses the aforementioned outstanding properties of a synchronous motor.

In a particularly advantageous embodiment, the synchronous motor comprises a rotating field generating device for generating a rotating field from the DC supply for a rotating stator magnetic field of the synchronous motor, where the rotating field generating device is in switchable electrical contact with the stator in emergency operation. As a result, the rotating field generating device can, at least in emergency operation where the synchronous motor is supplied with direct current, be electrically connected to the stator windings in such a way that a rotating field can be generated from the direct current that can provide a rotating stator magnetic field.

To do so, the rotating field generating device can be of any required design. In a particularly distinguished embodiment, the rotating field generating device is designed as a mechanical rotating field generating device that can be connected to the shaft of the synchronous motor. By means of a mechanical rotating field generating device, for example a commutator device mechanically connectable in emergency operation, direct current can be transformed by rotating the motor shaft over brushes and slotted collector segments such that an alternating or rotating, especially three-phase stator winding current is obtained. Thanks to the mechanical disconnecting position in normal operation, there is no mechanical wear at all, so that the mechanical rotating field generating device can have a long service life and low maintenance requirement.

If in accordance with the above embodiment the rotating field generating device is designed as a mechanically connectable rotating field generating device, it is furthermore particularly advantageous that the rotating field generating device can comprise a DC transmission unit, in particular two annular or circular DC slip-rings rotatable with the motor shaft and two fixed DC brush units. Furthermore, in this case the rotating field transmission unit can comprise in particular a multi-polar annular or circular rotatable commutation unit with commutator segments and several, in particular three, angularly offset and fixed rotating field brush units, where in emergency operation the direct current is transformed by the DC transmission unit and by the rotating field transmission unit to a rotating AC for supplying the stator. This embodiment hence refers to the design of the rotating field generating device comprising a DC transmission unit and a rotating field transmission unit, where the DC transmission unit comprises two DC slip-rings with appropriate brushes and the rotating field transmission unit comprises several, in particular three, six, nine or an integral multiple of three commutator units each comprising a brush unit and an appropriate number of commutation segments. In other words, this embodiment relates to a rotating field generating device that feeds direct current via slip-rings into a system rotating with the motor axis, and due to the rotary movement of the motor axis by means of a commutating unit a rotating field is obtained via commutation segments and rotating field brushes by means of several, in particular three, six, nine or a multiple of three fixed brushes, where the rotating field brushes are appropriately arranged to permit a commutating rotating field to be obtained for supplying the stator windings. This rotating field generating device hence indicates the design of a mechanically operating commutator for supplying the stator windings that generates a rotating field from a direct current supply by means of mechanical commutation. As a result, the rotating field generating device manages without the use of electronic components and generates thanks to its rigid connection to the rotating rotor shaft of the synchronous motor a rotor-synchronous rotating field that can be used for stator supply. As a result, in the event of a DC emergency supply the stator rotating field rotates synchronously with the rotor rotation, since the mechanically generated rotating field is dependently and permanently coupled to the shaft rotation of the motor.

A brush unit can comprise one or two brushes for diverting the current for a stator winding from the commutating unit, i.e. for removing the commutating segments as the commutating unit passes it. Each stator winding generally has at least two winding connections, so that two brushes of a brush unit may be needed for independent connection of each stator winding and are advantageously arranged geometrically on a winding axis and diagonally opposite to the commutation unit. However, wiring of the stator windings in a star connection with star center point, or in a delta connection with the winding ends of adjacent stator windings connected in correct phase to one another, is possible so that for every stator winding only one brush has to be provided per brush unit and per motor winding. In this way, stator windings operated in star or delta connection can only be connected to the same number of brushes as are provided in brush units or stator windings.

The required DC slip-rings and rotating field commutator rings according to the previous embodiment can be of any design and advantageously designed annular and arranged along the extent of the shaft axis of the synchronous motor. Hence the rotating field generating device requires a certain axial shaft length, increasing the size of the synchronous motor.

In an distinguished embodiment following the design variant presented above, the rotating field generating device comprises a slip-ring and commutator disc rotating centrically with the rotor axis of the synchronous motor, where the slip-rings and commutator segments of the DC and rotating field transmission units are arranged in a circular ring form and radially spaced from one another on at least one end face of the slip-ring and commutator disc, and where the DC and rotating field brush units are aligned in a direction parallel to the rotor axis and passing over the end face of the slip-ring and commutator disc connected torque-proof to the motor shaft. In other words, in this embodiment the rotating field generating device is designed as a disc where on an end face of the disc two uninterrupted DC circular rings and three or 3n (n∈N) segmented commutator circular rings are arranged in a circular ring form and at a radial distance, and provide on the disc surface the rotating field generating device. To do so, at least five brush units, of which two are DC brushes and at least three are rotating field brush units, pass over an end face of the slip-ring and commutator disc in order to apply direct current to the commutator disc and/or to tap the commutated three-phase AC from the commutator segments.

As a general principle, direct current and rotating field transmission units can each be arranged on opposite sides of a slip-ring and commutator disc, resulting in a radially compact design, but for reasons of mechanical disconnectability an arrangement of both units on a disc surface is advantageous, since an axial displacement of the disc away from the brush units has the effect of mechanically disconnecting the brush unit and slip-rings/commutator rings, so that a high degree of freedom from wear is obtained.

Based on the previous embodiment, a PCB module unit (printed circuit board) or electrical and electronic components in electrical contact with the DC and rotating field transmission unit, in particular the DC and commutator rings, are arranged at least on one end face of the slip-ring and commutator disc, in particular in rotationally symmetrical manner to the disc axis, where the PCB module unit can comprise passive and/or active electrical operating means for assisting the commutating process. A PCB module unit can comprise an electrical or electronic circuit in which active components such as power semiconductors, transistors, thyristors, or mechanical components such as relays, and passive components such as coils, chokes or capacitances, in particular capacitors, can be connected on one or more PCBs. Due to the mechanical commutating process, a rotating field is obtained that generates a three-phase AC with binary switch-on and switch-off, so that in the event of a high current flow through the rotating field generating device strong brush sparking occurs at the rotating field brushes and also high-frequency current proportions occur in the stator current due to the switch-on and switch-off effects. To prevent brush sparking, high-frequency current proportions and abrupt voltage jumps in the rotating field phases, smoothing passive operating means or electronic elements such as inductances and/or capacitances, and active electronic components such as transistors or thyristors in the current flow can be switched on by the rotating field generating device in order to achieve a dedicated smoothing and current curve shape of the rotating field. These can be arranged inside the PCB module unit. The PCB module unit is arranged between the DC transmission unit and the rotating field transmission unit, so that in the rotating part of the synchronous motor, in the transition area between direct current and three-phase AC or AC, the current signals can be shaped without an external connection being additionally necessary for externally shaping of the rotating field currents. As a result, a compact design and a dedicated and direct influencing of the stator current can be achieved, where a long service life, low-noise operation and a compact design of the rotating field generating device can be obtained.

As a general principle, the mechanical rotating field generating device can be active both in normal operation and in emergency operation, so that the brushes always pass along the slip-rings or commutator segments. In a particularly distinguished embodiment, the slip-ring and commutator disc is mounted axially movable on the motor shaft and by means of a coupling device connectable to the brush units in emergency operation and disconnectable in normal operation. For this purpose, the coupling device can be activated by the DC voltage applied to the rotating field generating device in emergency operation, so that it can be connected electrically to the fixed DC and rotating field brush units at least in emergency operation when the DC voltage supply is active and can be disconnected in AC normal operation.

Additionally and/or alternatively, it is also advantageously conceivable that the DC and rotating field brush unit is axially movable and can be coupled to the co-rotating but axially stationary slip-ring and commutator disc. By means of an axial movability of the slip-ring and commutator disc and/or the brush units, it is possible in simple manner to mechanically activate the rotating field generating device only in emergency operation, so that in normal operation no wear whatsoever occurs, thus considerably improving the service life, low noise and sturdiness of the rotating field generating device. To do so, it is furthermore conceivable that for axial movement a simple electromagnetic coupling mechanism can be used that for example supplies current to an electromagnet when the emergency operation DC voltage is applied, through the magnetic field of which a mechanical coupling is closed that connects the slip-ring and commutator disc to the brush units in a contactable manner. To assist the connection and/or disconnection movement, one or more coupling springs can be provided to assist the associated relative mechanical movements of the brush unit and the slip-ring and commutator disc.

Alternatively, an embodiment is conceivable for the rotating field generating device where it is a slip-ring device axially extending along the motor shaft axis, where a controlled mechanical lifting or lifting off of the brushes at the slip-rings is advantageously possible and in particular is conceivable by means of an electromagnetic coupling device.

Thanks to its mechanical design, it is very advantageous and compact when the rotating field generating device is comprised in a braking device of the synchronous motor. Synchronous motors, in particular pitch drive motors, typically have a braking device, in particular an electromagnetically actuatable brake, used to hold the motor shaft stationary. It is particularly advantageous to arrange a mechanical rotating field generating device inside the housing of the braking device, as firstly electromagnets are already provided for axial connectability of slip-ring and commutator disc to brush units, secondly a DC supply is routed to the braking device, and thirdly a spatial proximity to the motor windings and mechanical coupling to the motor shaft axes are achieved. As a result, it is possible without major technical modifications, merely by integration of a mechanical rotating field generating device into a braking device of a commercially available synchronous motor, to permit operation with AC or three-phase AC and also with DC without having to alter the overall size of the synchronous motor.

The motor operation switching unit for changing between a normal operation and an emergency operation can generally be designed as a pole-reversing switching unit where direct switchover is possible between three-phase AC or AC-carrying phases of an AC voltage supply and DC supply cables of a DC voltage supply. In a particularly distinguished embodiment, the motor operation switching unit comprises a normal operation switchover unit for an AC or three-phase AC normal operation of the synchronous motor, in particular for an AC inverter operation, and an emergency operation switchover device for a DC emergency operation of the synchronous motor, in particular for a DC operation in which a stator rotating field can be generated by the rotating field generating device. Thus the motor operation switchover unit comprises a normal operation switchover device and an emergency operation switchover device in order to independently and separately connect to the direct current synchronous motor an AC or three-phase AC supply in normal operation and a DC supply in emergency operation. Hence it is possible in particular by switching off the two switchover devices to achieve a stationary operation of the pitch drive device and also to perform a separate and independent switching on and off in normal operation and in emergency operation.

If the motor operation switchover unit is designed in accordance with the previously described embodiment, it is furthermore advantageous for at least the emergency operation switchover device to be able to switch on an electrical current supply line between the rotating field transmission unit and the stator. In normal operation the rotating field transmission unit is thus advantageously separated both mechanically and electrically from the stator. Only in the case of an emergency operation is a connection between the rotating field transmission unit and the stator switched on electrically to supply the stator with commutated three-phase AC via the rotating field transmission unit. As a result, the rotating field generating device can be disconnected both electrically and mechanically from the synchronous motor in emergency operation.

Finally, the synchronous motor can be typically designed as a self-excited motor with permanent magnets. In a particularly advantageous embodiment, the rotor of the synchronous motor is a separately excited rotor, where the current supply to the rotor winding can also be achieved via the DC transmission unit of the rotating field generating device. In a separately excited motor, the rotor comprises rotor windings through which flows a direct current and which generate a magnetic field permanently rotating with the rotor axis in order to follow the rotating field of the stator winding. If a DC transmission unit is already provided on the synchronous motor to feed direct current into the rotating field generating device, direct current is already transmitted into the rotating part of the rotor. This current can also be advantageously used to supply current to windings of a separately excited rotor, in order to benefit from the advantages of a separately excited motor such as increased efficiency, controllable slip and more besides. In this case, it may be advantageous to design only the rotating field transmission unit mechanically connectable, where the DC transmission unit transmits current both in normal and in emergency operation.

The invention additionally relates to a method for operating a pitch drive device, where in a normal operation the synchronous motor is operated to set a rotor blade pitch of a rotor blade of a wind power or hydroelectric power station by means of an AC or three-phase AC supply, and in an emergency operation the synchronous motor can be operated by means of a DC supply. The inventive method thus focuses on switching over a synchronous motor that can be operated in normal operation with AC or three-phase AC. In the case of an emergency operation in which for example the mains voltage supply fails, an electronic rectifier is defective or large parts of the system have been made unserviceable by a lightning strike, switchover to a DC source, for example a battery, takes place and the synchronous motor is supplied with direct current. In this case, the synchronous motor can for example be switched electronically such that it can operate as a DC machine.

Based on the above method, it is advantageous that when an emergency situation occurs, in particular when an inverter unit supplying the synchronous motor or a mains supply fails, the motor operation switchover unit switches from an AC normal operation, where the stator of the synchronous motor is in particular directly connected via the motor operation switchover unit to the inverter unit to generate a stator rotating field, to a DC emergency operation in which the stator is connected to a DC emergency operation control and supply device for generating a stator rotating field with interposition of the rotating field generating device and via the motor operation switchover unit. In other words, it is possible to switch between a normal operation which is mostly an inverter operation to an emergency operation in which a rotating field generating device is interposed between the DC supply and the stator winding and which can generate from the supplied DC voltage a three-phase AC voltage which rotates synchronously with the rotor rotation and is supplied to the stator windings. As a result, the properties of the synchronous motor can be maintained in a DC emergency operation too, since the stator is supplied in emergency operation with a rotating field as in normal operation. It is in particular conceivable and advantageous for the rotating field generating device to represent a device mechanically connectable to the motor shaft of the motor which is only connected mechanically to the rotating motor shaft in the event of emergency operation and thus remains inactive and free from wear is normal operation.

The following explains the invention in greater detail on the basis of figures showing different embodiments. Identical technical features have the identical reference numbers here. The person skilled in the art can, on the basis of the embodiments shown, also develop combinations of the technical solutions shown which fall within the scope of the invention.

The drawings show, in

Figure 2:
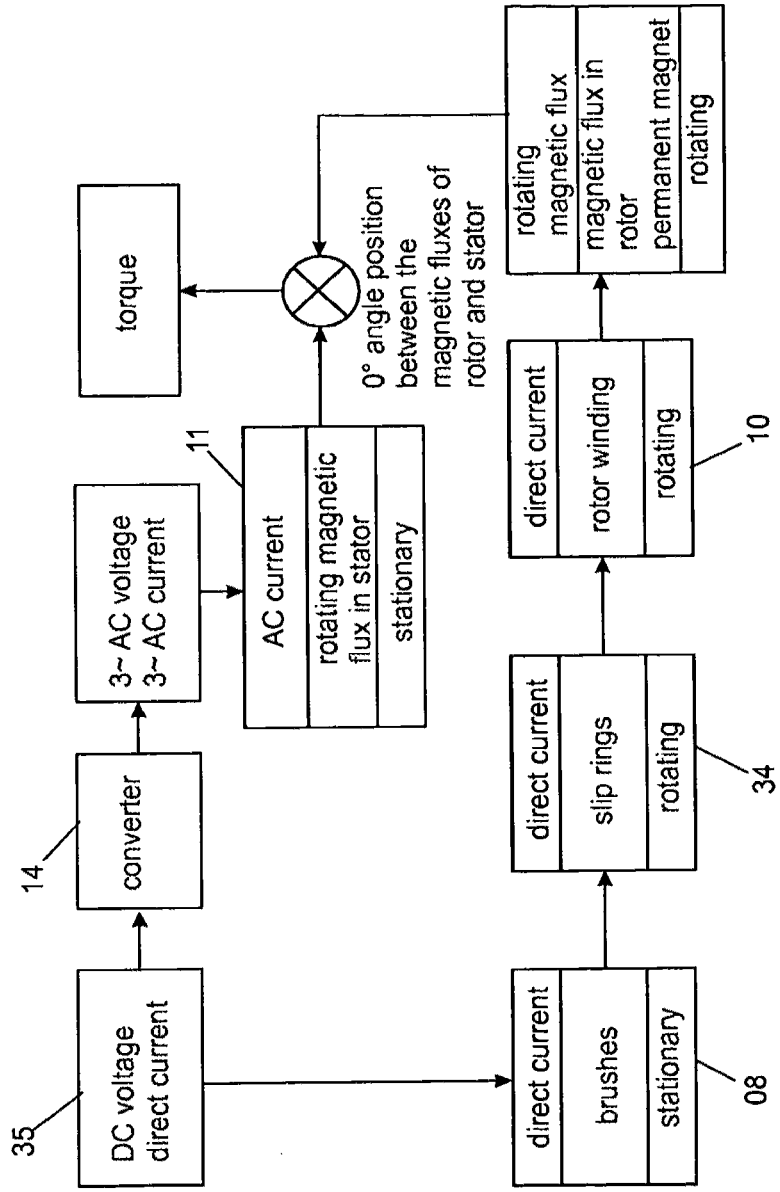
Figure 3:
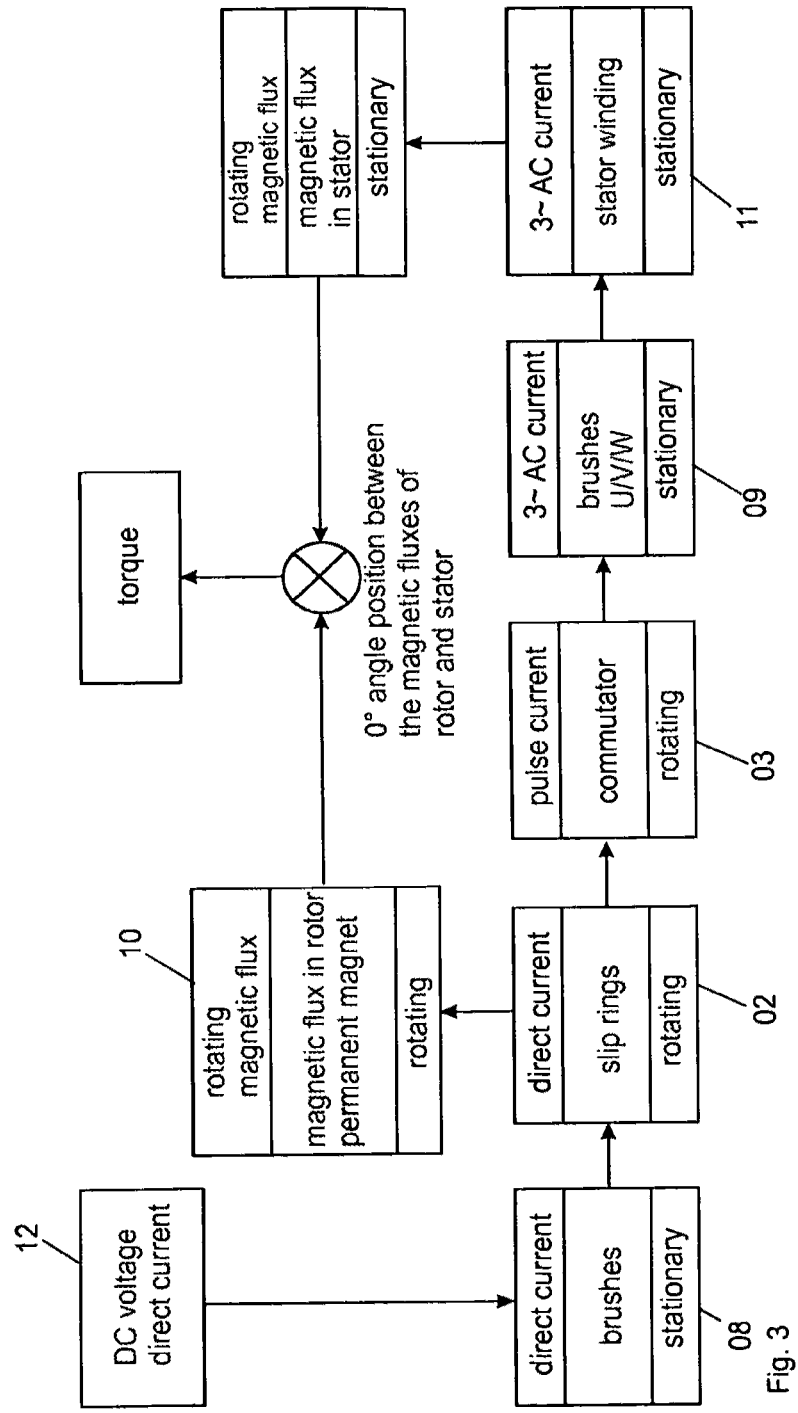
Figure 4:
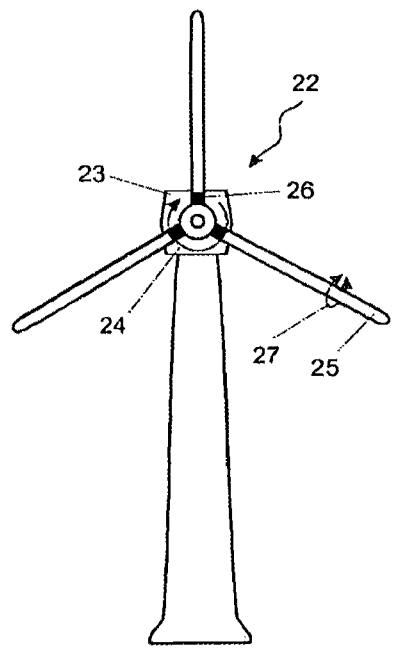
Figure 5:
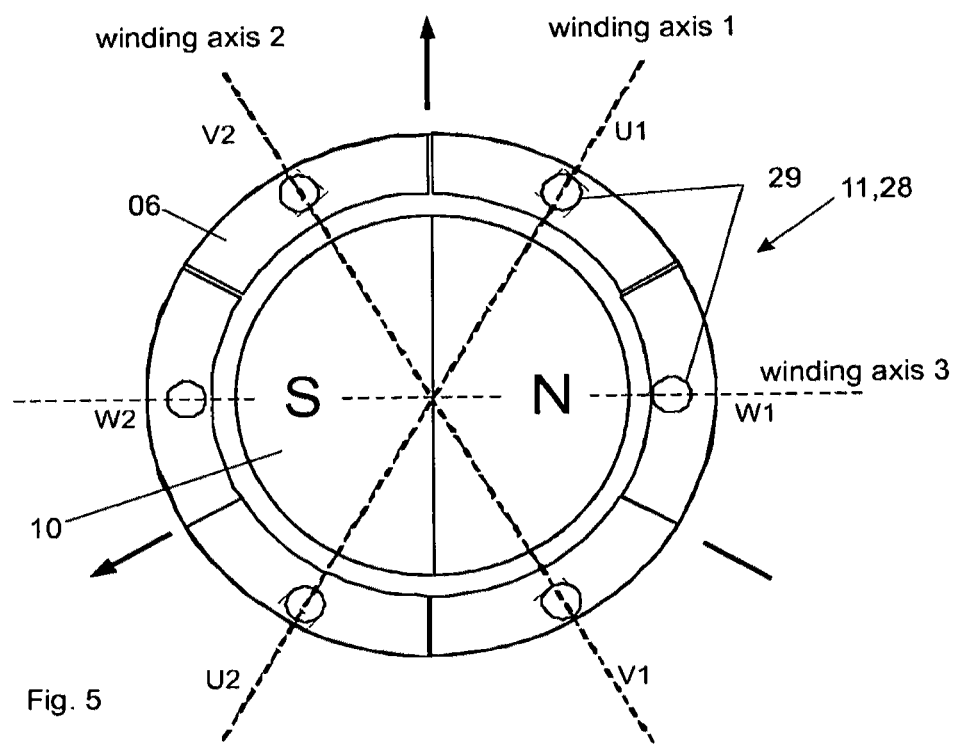
Figure 6:
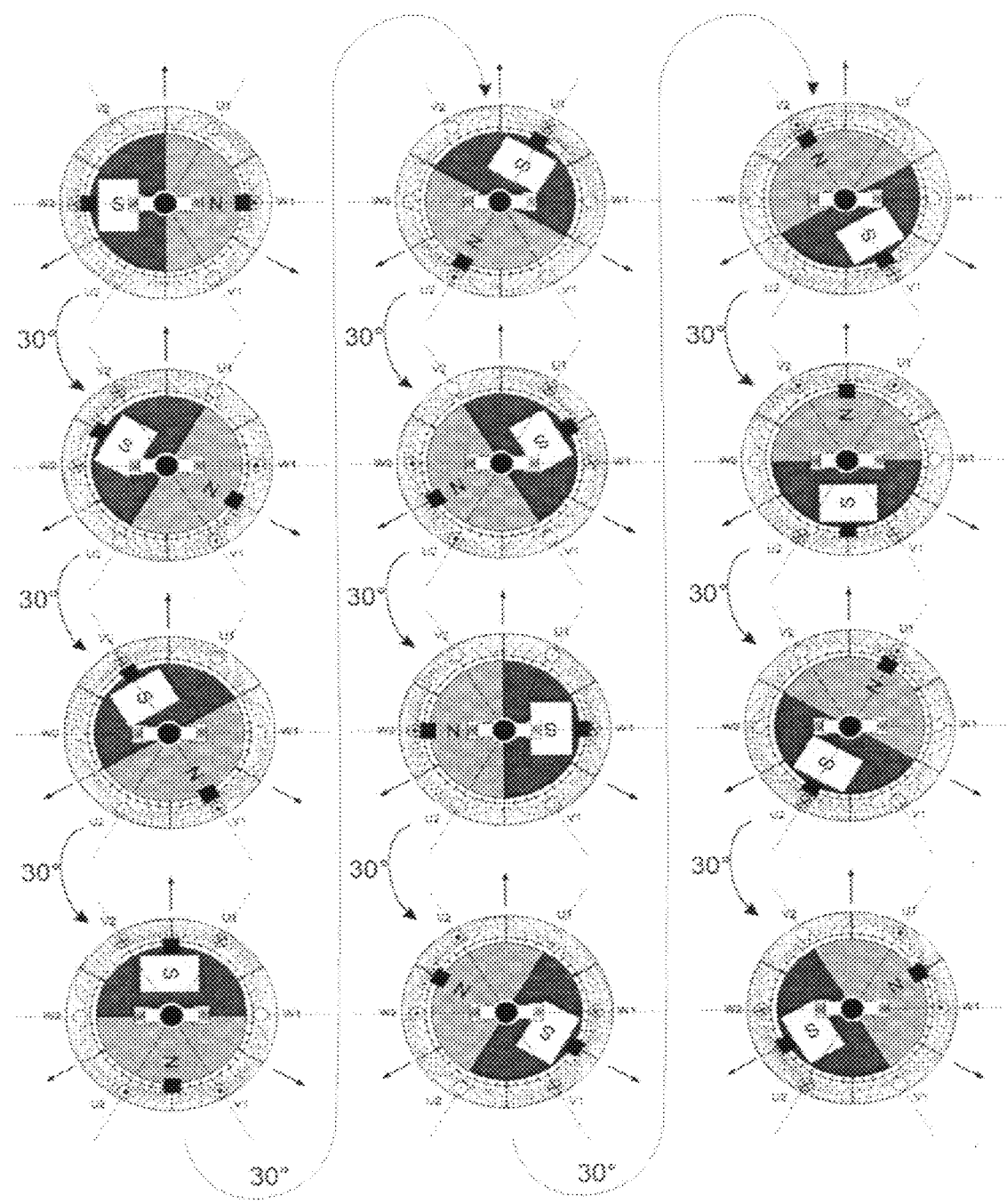
Figure 7:
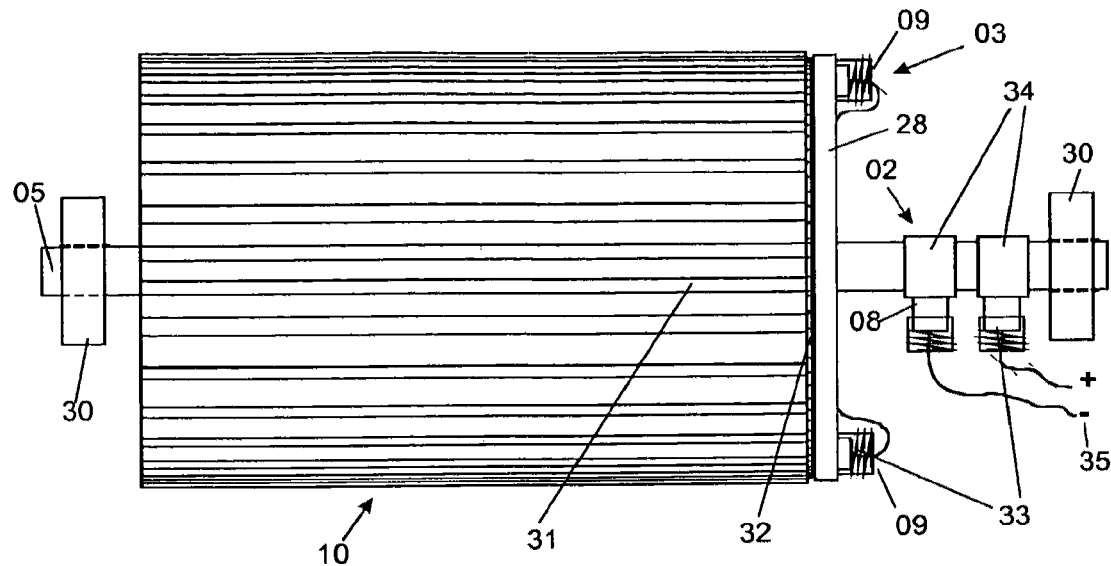
Figure 8:
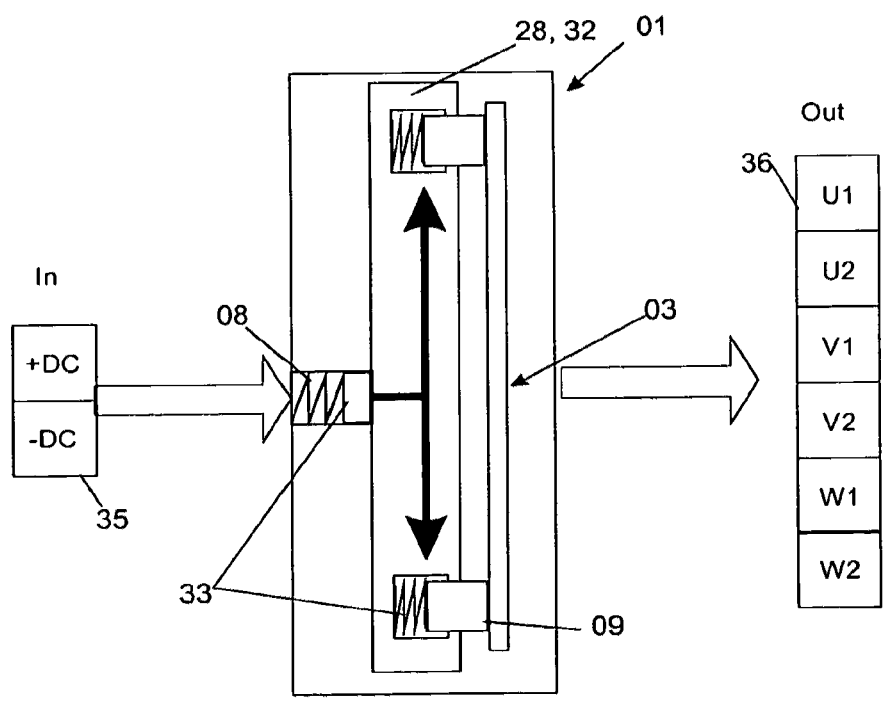
Figure 9:
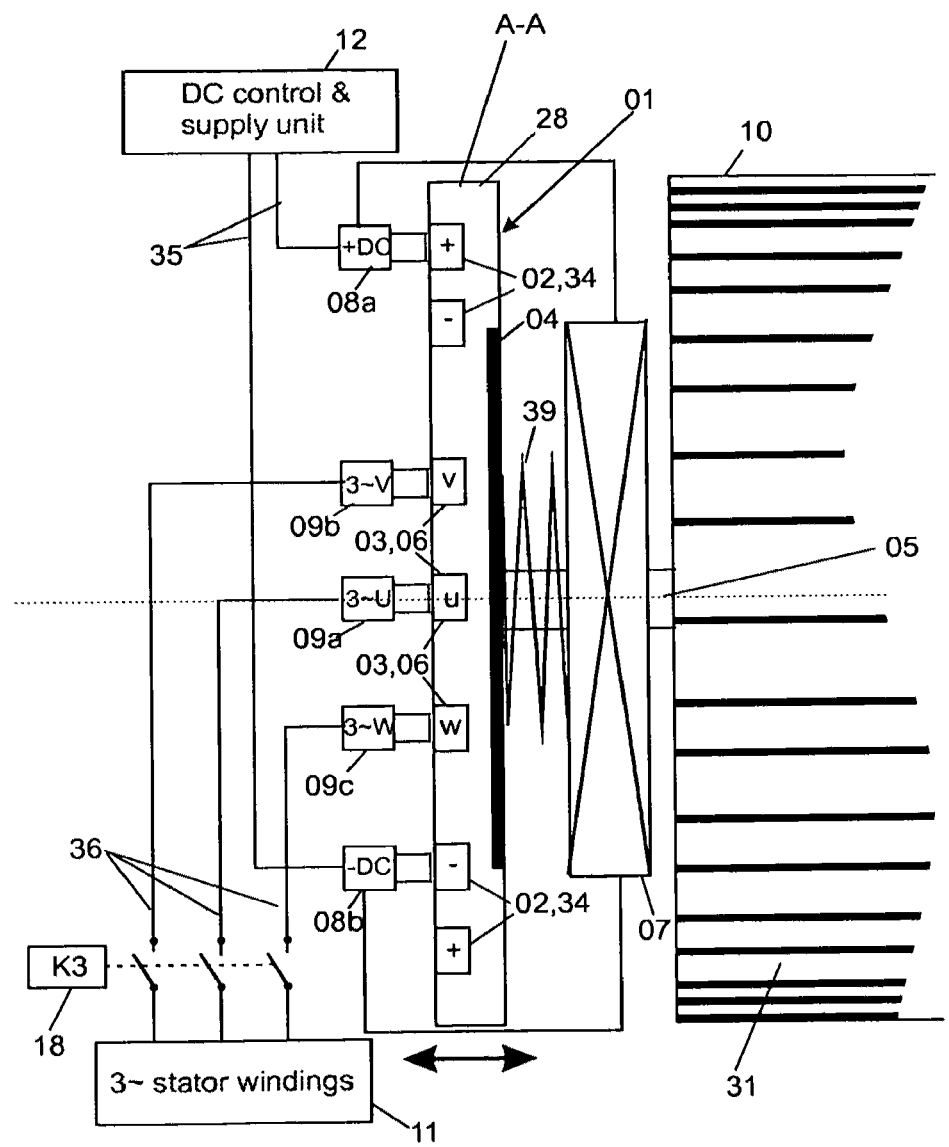
Figure 10:
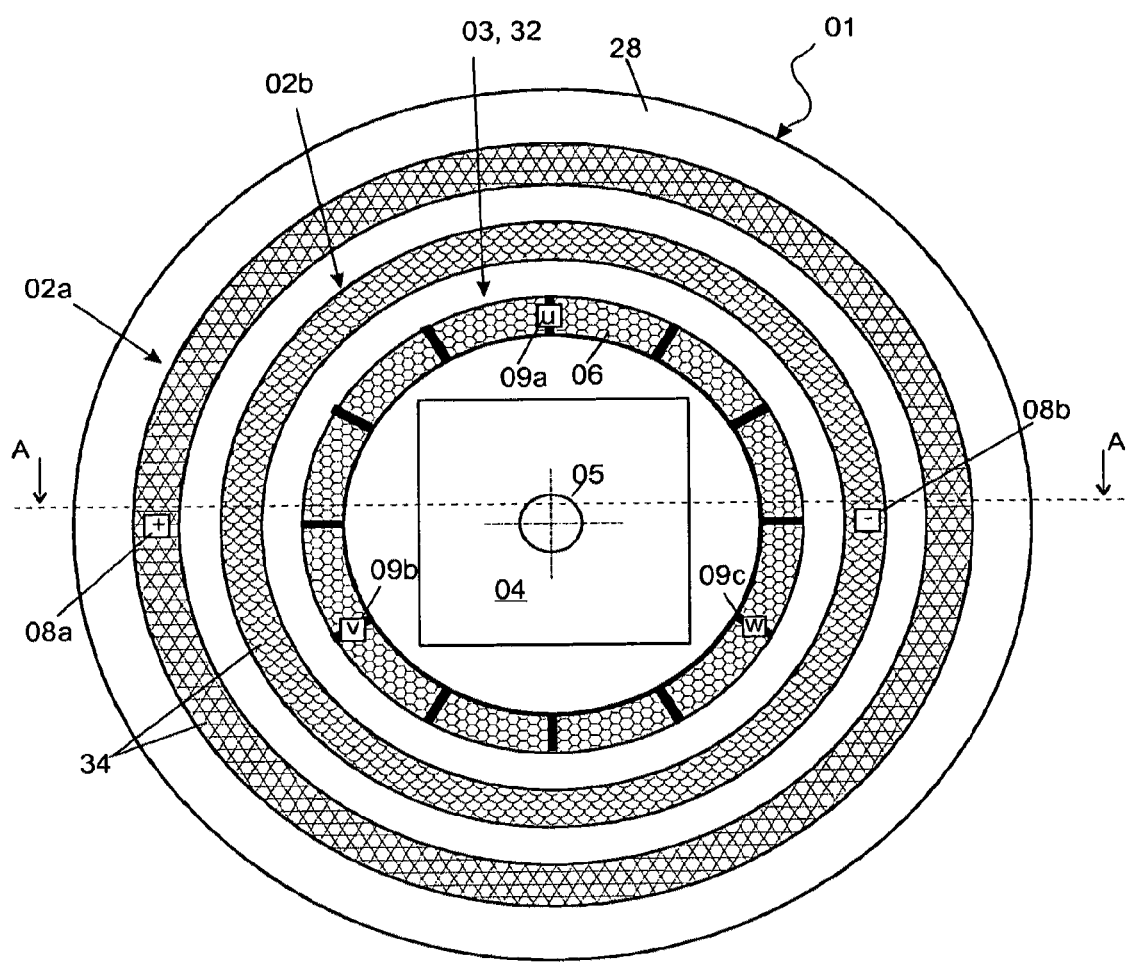
Figure 11:
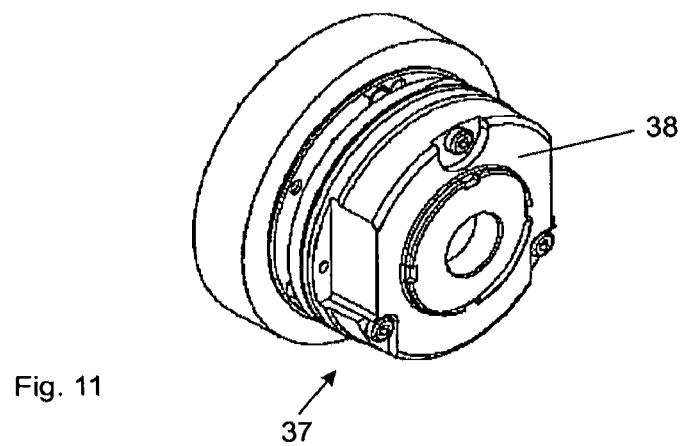
Figure 12:
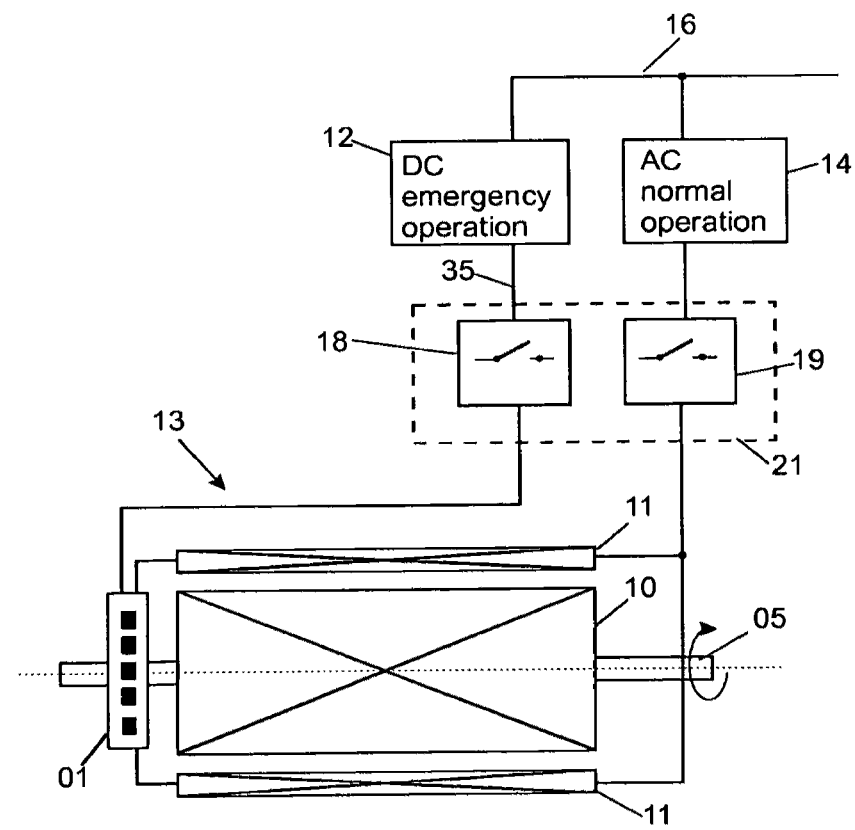
Figure 13:
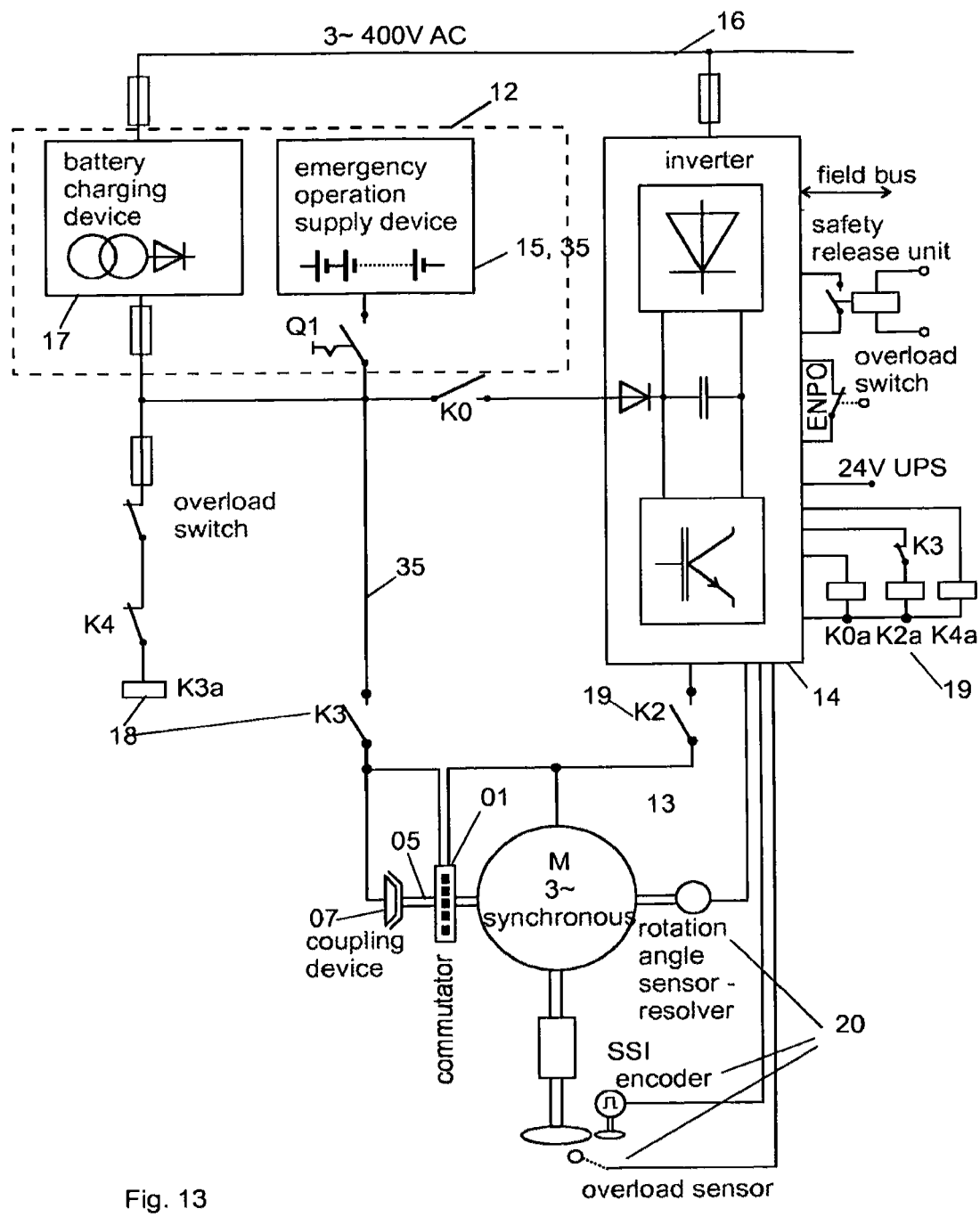
Figure 15:
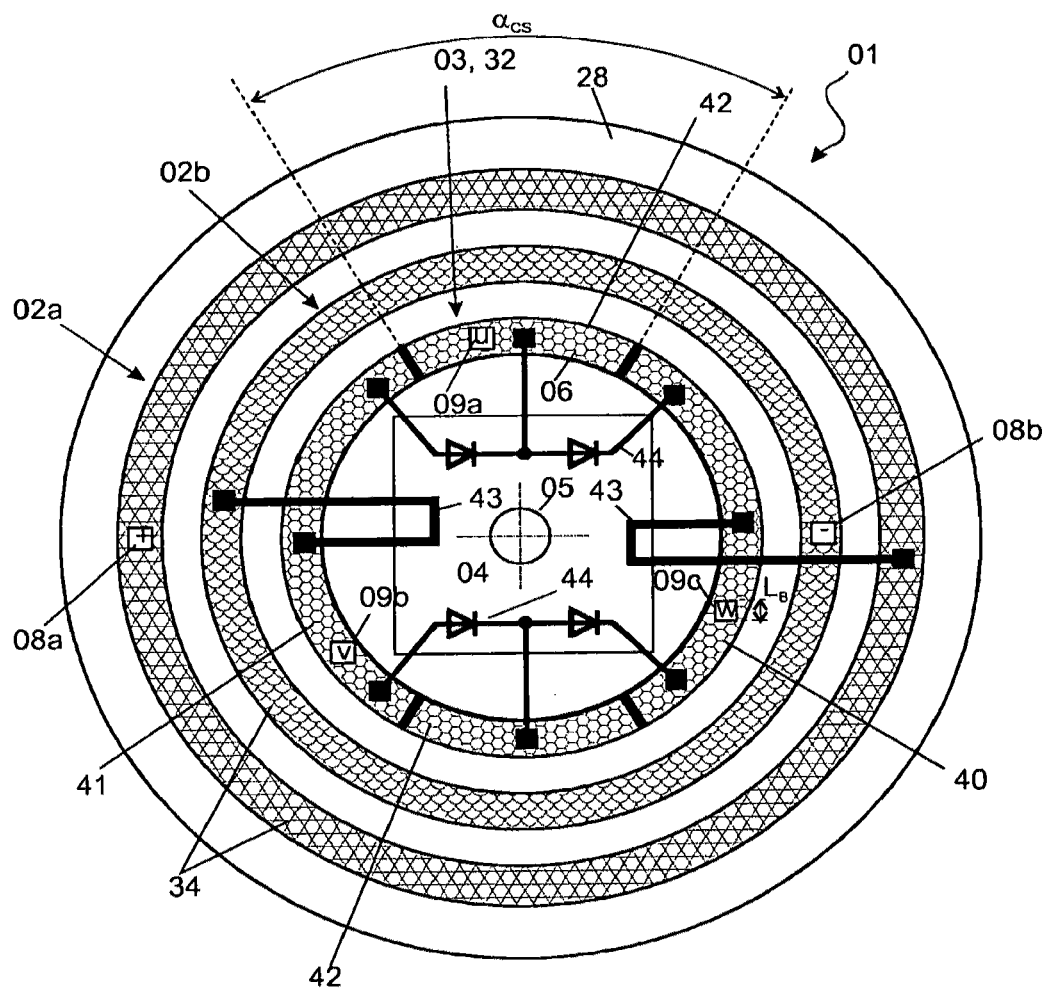

FIG. 1: a schematic operating diagram for torque generation of a DC motor of the prior art;

FIG. 2: a schematic operating diagram for torque generation of a three-phase AC motor of the prior art;

FIG. 3: a schematic operating diagram for torque generation of an embodiment of the invention;

FIG. 4: a schematic view of a wind power station with pitch drive;

FIG. 5: a schematic view of a commutator disc of an embodiment;

FIG. 6: a current direction sequence within a three-pole stator winding for generating a rotating field provided by an embodiment of a rotating field generating device;

FIG. 7: a schematic side view of a synchronous motor with axially arranged DC slip-rings and a disc-like rotating field transmission unit of a rotating field generating device of an embodiment;

FIG. 8: a schematic view of the mode of operation of a rotating field generating device of an embodiment;

FIG. 9: a schematic enlarged view of a disk-like rotating field generating device of an embodiment;

FIG. 10: a plan view of the slip-ring and commutator disc of the rotating field generating device according to FIG. 9;

FIG. 11: a brake housing of an electric motor;

FIG. 12: a schematic view of the external wiring of a synchronous motor with motor operation switchover unit of an embodiment of a pitch drive;

FIG. 13: a detailed schematic circuit diagram for connection of a synchronous motor of an embodiment of a pitch drive device according to a further embodiment;

FIG. 14: a principle circuit diagram, current flow sequence and current flow angle diagram of an embodiment of a synchronous motor in star connection;

FIG. 15: a slip-ring and commutator disc of an embodiment for generating a current flow sequence according to FIG. 14.

FIG. 1 shows an operating diagram of torque generation for a DC motor with mechanical commutator. A DC supply 35 provides a DC voltage and a direct current which is supplied on the one hand to a stator winding 11 in which the direct current generates a stationary magnetic flux in the stator or the stator is designed as a permanent magnet for generating a stationary magnetic flux. On the other hand, the DC voltage is supplied via brushes 08 to a commutator 32 representing a rotating field transmission unit. The commutator 32 is arranged torque-proof on a rotating axis of the motor and generates a commutating pulse current which is supplied as alternating current to a separately excited rotor 10 with rotating rotor windings. Inside the rotor windings, a magnetic field stationary when seen from the stator is generated, in which the current polarity is reversed in identical rotation angle positions so that a rotating magnetic field is obtained that co-rotates but which when seen from the outside is a stationary magnetic field, so that the rotor magnetic field and the stator magnetic field can be at a defined angle, in particular at a 90° angle to one another, resulting in a torque that drives the direct current motor.

FIG. 2 shows in an analog view the generation of a torque of a three-phase AC synchronous motor 13 with separately excited rotor. A DC supply 35 provides a DC voltage and a direct current which for example is generated by means of a bridge rectifier from an AC mains voltage or by means of a battery. The DC voltage is supplied to a converter 14 which generates from it a commutating rotating field with which the stator windings 11 are fed in order to generate a rotating stator field. By means of the converter 14, it is possible by dedicated influencing of the half-bridges to set the frequency of the rotor voltages and hence the speed of the synchronous motor. Parallel to this, the DC voltage of the DC voltage source 35 is fed via brushes 08 and slip-rings 34 to the rotor of the synchronous motor in order to supply current to the rotor windings. This rotor current generates a stationary magnetic field that seems from the viewpoint of the stator to rotate with the rotor. This rotating magnetic field attaches to the rotating stator magnetic field and effects a 0° angle position between the magnetic fluxes of the rotor and the stator, leading to the generation of a torque with which the synchronous motor does its work.

FIG. 3 shows schematically the operating sequence for generation of a torque in a three-phase synchronous motor in the event of emergency operation using an embodiment of a mechanical rotating field generating device. An emergency operation control and supply unit 12 provides a DC voltage and a DC current that are transmitted by means of a DC transmission unit 02 comprising a DC brush unit 08 into the rotating area of the synchronous motor 13 and there for example feed a separately excited rotor winding. Alternatively, the rotor magnetic field can also be generated by means of a permanent magnet. The direct current in the rotating part of the synchronous motor is converted by the rotating field transmission unit 03 comprising a rotating field brush unit 09 into a three-phase stator AC and transmitted in turn to the fixed part of the synchronous motor. The stator AC is supplied to stator windings 11 to generate a rotating stator magnetic field. The rotating magnetic field of the rotor couples with a 0° angle position to the rotating stator magnetic field, as a result of which a torque is generated. The rotor runs in phase with the rotating magnetic field of the stator.

Hence in accordance with the embodiment in FIG. 3, a direct current from the resting part of the synchronous motor 13 is transmitted by means of the rotating field generating device, mechanically rotating, to the rotating part of the synchronous motor 13 and then commutated by means of a commutating device which is part of the rotating field transmission unit 03 into three-phase AC and in turn transmitted by means of a rotating field brush unit 09 into the stationary part of the synchronous motor 13 in order to provide a rotating field synchronously rotating with the rotor for the stator windings 11. A rotating field synchronized in this way with the rotation of the rotor has the effect that the rotor can never become out of sync in emergency operation, so that the synchronous motor 13 cannot abruptly stop in emergency operation.

FIG. 4 shows schematically a wind power station comprising a nacelle 23 to which a rotor 24 is arranged on a rotor shaft, where three rotor blades 25 each with a 120° angle offset are arranged on the rotor 24. Each rotor blade 25 can be adjusted by means of a pitch drive device 26 in its angular position, i.e. in its rotor blade pitch 27 relative to the wind direction, in order to achieve a targeted effect on the rotor rotation and the energy input.

FIG. 5 shows schematically the correlation between the arrangement of windings 29 of a stator 11 with the arrangement of commutator segments 06 on a slip-ring and commutator disc 28, where a permanently excited rotor 10 with north pole and south pole in the interior of the circular disc 28 is shown schematically. The windings of the stator 11 comprise a U1-U2, V1-V2 and W1-W2 winding. Commutator segments 06 of the slip-ring and commutator disc 28 diametrically arranged and opposite each other on fixed winding axes 1, 2 and 3 are assigned to these six winding connections. Depending on the rotation position of the rotor, the individual commutator segments 06 are connected to the respective stator windings, where the current for the stator windings is tapped via rotating field brush units 08, not shown. Each rotating field brush unit 08 comprises two brushes which are arranged in accordance with the drawn winding axes 1 to 3 diagonally opposite on the commutator segments 06 for current pickup. The winding connections can be connected and supplied with current independently of one another, so that the winding U1-U2 can be supplied with current independently of the windings V1-V2, W1-W2 via the commutator segments 06 and the corresponding brushes of the brush unit. Also not shown is the DC supply to the slip-ring and commutator disc 28, which is transmitted by means of DC brush units and DC slip-rings (not shown) to the slip-ring and commutator disc 28. A rotation of the rotor 10 thus generates a commutating current supply to the three stator windings U1-U2, V1-V2 and W1-W2 depending on the rotation angle of the rotor 10.

In detail, the current supply processes for the individually suppliable stator windings 29 are shown in FIG. 6, where the allocations of commutator segments 06 to stator windings 29 shown in FIG. 5 and dependent on the rotation angle of the rotor 10 can be traced schematically. The transition from every single partial figure to the subsequent partial figure in the direction of the arrow describes a rotation of the permanently excited rotor 10 by 30°. On the outer circumference of each partial figure, the current directions through the stator windings U1-U2, V1-V2 and W1-W2 are shown, where in each case a stator magnetic field is set with a 0° phase shift relative to the magnetic field polarity of the rotor. If for example the rotor rotates by 30° from an initial position of 0°, then windings are evenly supplied with current in the current direction W2-W1 and V2-V1—discernible by the current direction indicated by "x" and "•" through the stator windings (second picture of FIG. 6). If the rotor rotates by a further 30°, i.e. up to 60° relative to the initial position, only the winding V2-V1 is supplied with current. A further 30° causes current to be supplied in the current direction V2-V1 and U1-U2. This is followed by a current supply to U1-U2. This is followed by a uniform current supply to U1-U2 and W1-W2. Accordingly, a 360° rotation of the rotor proceeds with either a single-phase current supply to a stator winding, or a parallel and uniform current supply to two winding connections offset to one another by 60°. However, with a correspondingly high number of commutator segments a simultaneous correctly phased current supply to all stator windings is conceivable.

FIG. 7 shows schematically a side view of an embodiment of a synchronous motor with mechanical rotating field generating device containing a DC transmission unit 02 comprising two DC slip-rings 34 and brushes 33 at an axial distance apart, where the DC slip-rings 34 are arranged torque proof on a motor shaft 05. A rotating field transmission unit 03 comprises a commutator disc 32 containing commutator segments 06 in the form of circular rings as shown in FIG. 10, whose tapping is achieved via three rotating field brush units 09. The motor shaft of the synchronous motor is mounted by means of two rotor bearings 30, where a rotor 10 comprising sheet metal lamellas 31 is torque-proof arranged on the rotor axis 05. If direct current is applied to the DC brushes 33 by means of a DC supply 35, the direct current is transmitted via the DC slip-rings 34 into the rotating part of the synchronous motor. The DC slip-rings 34 are connected to the commutator segments 06 of the commutator disc 28 via electrical connections, not shown and optionally via a PCB module unit which can perform smoothing of the current of the rotating field phases. By a relative movement of the commutator segments relative to the fixed rotating field brushes 09, a commutation of the rotating field phases depending on the rotation angle of the rotor is achieved, which can be picked up by the rotating field brushes 09 and supplied to the individual stator windings in accordance with the current supply sequence shown in FIG. 6.

Schematically, FIG. 8 shows the course of the transformation of the DC supply to a three-phase AC supply by means of a mechanical rotating field generating device for stator windings of a three-phase AC synchronous motor that can be supplied with current independently of one another. A direct current supply 35 providing the two current potentials +DC and −DC supplies direct current via a DC brush unit 08 to the rotating part of a rotating field generating device 01. The rotating field generating device 01 comprises a commutator 32 arranged inside a rotating field transmission unit 03. Due to a rotation of the commutator 32 relative to a fixed rotating field brush unit 09, the rotating field brushes are supplied with current in commutating form with a DC supply polarity in the correct rotor position. Thus a rotating field supply 36 with a correct rotor position commutation of the phases U1, U2, V1, V2 and W1, W2 serving to supply current to the winding of a stator is obtained at the output. By variation of the number of commutator segments, multi-pole stator windings too can be supplied with current by the mechanical rotating field generating device.

FIG. 9 shows schematically the outer connection of a mechanical rotating field generating device 01 for a stator winding of a synchronous motor in star or delta connection. The rotating field generating device 01 is arranged on a motor shaft 05 of a synchronous motor, where a rotor with rotor lamellas 31, in this case a permanently excited rotor, is arranged torque-proof on the motor shaft 05. The rotor lamellas are used to reduce the current flow of induced voltages in the rotor in order to minimize induction losses. The mechanical rotating field generating device 01 comprises a slip-ring and commutator disc 28 whose detailed composition is shown in plan view in FIG. 10. In this connection, the slip-ring and commutator disc 28 comprises a DC transmission unit 02 consisting of two circular rings 02 with uninterrupted conduction. Inside the inner radius of the circular rings 02 of the DC transmission unit, a commutator circular ring with commutator segments 06 of a rotating field transmission unit 03 is arranged that is connected via three rotating field brush units 09 with three stator windings in star or delta connection. Due to the star or delta connection of the stator windings, a single-phase supply to each stator winding or to each pair of stator windings is sufficient, so that each rotating field brush unit 09 contains only one brush. Alternatively, an independent current supply to each stator winding is conceivable, where each rotating field brush unit comprises two brushes as one supply line and one return line, and the two associated brushes are favorably arranged diametrically on the slip-ring and commutator disc 28. The individual commutator segments 06 are assigned depending on the rotation angle to a connection of the three stator windings U1-U2, V1-V2 and W1-W2. The DC brush units 08 are connected via direct current supply cables 35 to an emergency operation control and supply unit 12 which in emergency operation ensures a DC supply to the pitch drive of the synchronous motor. Accordingly, the three rotating field brush units 09 are connected via a contactor acting as the emergency operation switchover device 18 to stator windings 29 of the stators 11 via rotating field output cables 36.

As a general principle, the pitch drive synchronous motor 11 is supplied in a normal operation with three-phase AC so that the mechanical rotating field generating device 01 remains inactive. To prevent any mechanical wear, the slip-ring and commutator disc 28 is connected in axially adjustable manner by means of a coupling spring 39 to a coupling device 07 that can comprise an electromagnet. If voltage is now applied via the DC supply cables 35 to the DC brush units 08a, 08b, the electromagnet of the coupling device 07 located in the fixed part of the motor is supplied with current at the same time. As a result, the coupling device is activated and moves the slip-ring and commutator disc 28 against the fixed DC and rotating field brush units 08, 09 in order to close their sliding contacts and to create a mechanical friction connection between the slip-ring and commutator disc 28 and the brush units 08, 09. If the DC supply is interrupted, the coupling spring 39 effects an axial resetting of the slip-ring and commutator disc 28 away from the brush units 08, 09, so that a wear-free and electrically separate movement of the slip-ring and commutator disc 28 relative to the brush units 08, 09 is enabled. Furthermore it is also conceivable, that the slip-ring and commutator disc 28 is longitudinal fixed at the rotor-axis and that the fixed DC and rotating field brush units 08, 09 can longitudinally movable by means of a coupling device 07.

FIG. 10 shows a plan view onto a lateral surface of the slip-ring and commutator disc 28 of a mechanical rotating field generating device 01, as shown in FIG. 9. The direct current and rotating field transmission unit 02 and 03 comprises conducting circular rings arranged on an end face of the slip-ring and commutator disc 28. As a general principle, DC and rotating field transmission units 02, 03 can be arranged on the two opposite end faces of the disc 28, however it is possible by arrangement on a single side to achieve by means of an axial displacement of the disc a mechanical connection/disconnection from the fixed DC and rotating field brush units 08, 09. The DC transmission unit 02 comprises two circular ring-shaped and uninterrupted copper coatings 02a, 02b which are radially at a distance from one another and in whose interior a single segmented circular ring of a rotating field transmission unit 03 is arranged. This circular ring comprises twelve commutator segments 06 electrically tapped by means of three rotating field brush units 09a to 09c as contacts U, V, W and supplied to the three corresponding stator windings. The rotating field brush units can comprise either three brushes (single-phase tapping) for supplying stator windings already wired to one another in a star or delta connection, or each rotating field brush unit comprises two brushes (two-phase tapping) for an electrically independent current supply to each stator winding. Symmetrically to the disc center point, through which the motor shaft 05 passes axially, a PCB module unit 04 is arranged on which both active and passive electronic components, in particular diodes, resistors, capacitors and/or coils, can be arranged and create an electrical connection between the two circular rings of the DC transmission unit 02 and the individual commutator segments 06 of the rotating field transmission unit 03. The PCB module unit 04 is furthermore used for smoothing the commutated direct current and for suppressing brush sparking.

FIG. 11 shows schematically in a three-dimensional perspective a housing of a motor brake 37 as is frequently arranged on a synchronous motor and which can if required mechanically stop a motor shaft 05. The motor brake 37 is encapsulated inside a brake housing 38 and is as a rule activated, i.e. opened or closed, by means of direct or alternating current. It is possible by a simple modification of a motor brake 37 of this type known from the prior art to arrange a mechanical rotating field generating device 01 inside the brake housing 38 in order to give a synchronous motor known per se the characteristic of a DC operation by means of mechanical commutation.

FIG. 12 also shows schematically an external connection of an embodiment of a synchronous motor 13 with rotating field generating device 01, stator windings 11 and a rotor 10 rotatably mounted on a motor shaft 05. By means of a mains supply 16, a three-phase field for a normal operation is provided by an inverter unit 14. A normal operation switchover device 19 is incorporated in a motor operation switchover unit 21. In normal operation, the windings of a stator 11 of the synchronous motor 13 are supplied by means of the inverter unit 14 with current in the correct rotation direction.

In the case of an emergency operation, the motor can be supplied with direct current by means of an emergency operation control and supply unit 12 whose DC source is charged via the mains supply 16 in normal operation. To do so, the direct current of the emergency operation control and supply unit 12 is switchably supplied to the mechanical rotating field generating device 01 via an emergency operation switchover device 18 of the motor operation switchover unit 21, said rotating field generating device 01 generating from the direct current a commutating AC for supplying the stator windings of the stator 11.

Finally FIG. 13 shows a detailed circuit for operating an embodiment of a synchronous motor 13 in which by means of a mains supply 16 providing a three-phase AC firstly an inverter unit 14 is supplied and secondly an emergency operation control and supply unit 12. By means of the mains supply 16, the batteries of the emergency operation control and supply unit 12 can be charged with the aid of an emergency operation charging device 17.

The inverter unit 14 comprises a three-phase bridge rectifier, a DC voltage intermediate circuit and an inverter which provides via a contactor K2 three commutating motor phases that are supplied to the stator windings of the synchronous motor 13. The inverter unit 14 is connected for control to a field bus and to various safety release devices and overload circuits and contactors K0a, K2a, K4a of a normal operation switchover device 19.

The emergency operation control and supply unit 12 can in emergency operation provide by means of a battery-powered emergency operation supply unit 15 a DC voltage which on the one hand can be fed via the contactor K0 to the DC circuit of the inverter unit 14 in order to continue operating the motor 13 "in normal operation" via the three-bridge inverter in the event of failure of the mains supply 16, and on the other hand can be supplied by opening of the contactor K0 and closing of the contactor K3 to the DC supply 35 of the mechanical rotating field generating device 01 for providing a commutating AC for the stator windings of the motor 13. For dedicated influencing of the converter of the inverter unit 14, various motor measurement and monitoring units 20 are arranged on the motor 13 and comprise a rotation angle sensor, also called a resolver, an SSI encoder and an overload sensor. The SSI (synchronous serial interface) encoder is used to process and transmit various electrical and mechanical sensor data of the motor measurement and monitoring devices 20 to the inverter unit 14. By means of this feedback the behavior of the inverter unit 14 can be selectively controlled. Finally, a brake 07 is arranged on the motor shaft 05 of the motor, in addition to the rotation angle sensor, which in the event of normal operation (closed contactor K2) and emergency operation (closed contactor K3) is released.

FIG. 14 shows a star connection of a single-pole synchronous motor for use in an embodiment of a pitch drive device. Single-pole describes in this context that the synchronous motor comprises only three current windings u,v and w. However, the following principle can also be applied to n-pole synchronous motors with 3n windings.

FIG. 14a shows the principle of a star connection where three motor windings u,v,w are connected together each with one connection. Hence the motor can be supplied with current only with the remaining three connections u, v and w. Each phase winding comprises in the symbol circuit a coil $L_s$ and a resistor $R_s$ which incorporates the inductive and ohmic proportion of the motor winding impedance. If a DC voltage with two potentials is available for supplying current to the motors, there are theoretically $3^3$ possibilities for supply, since each phase can be supplied with positive potential, negative potential or remain. Of these possibilities, however, those in which no current can flow or where the sum of the inflowing currents does not match the sum of the outflowing currents (Kirchhoff's first rule) can be discarded, so that only 12 current supply possibilities remain, which have to be chosen in a correct phase sequence. FIG. 14b thus shows a correct-phase current supply sequence where, in the case of changing supply to the motor windings u, v and w with 0V, +1V and −1V respectively, and assuming that each motor winding has an impedance of 1 S, the current curves shown in the table according to FIG. 14b are obtained, the behaviors of which are shown over a full 360° period, i.e. one revolution of the motors in FIG. 14c. It is thus possible with 30° steps to make a change in the current supply to the motor windings. The purpose of a rotating field generating device in accordance with the invention is to provide the current supply sequence shown in FIG. 14b by appropriate connection of the DC slip-rings to segments of the commutator.

In this contrast, FIG. 15 shows a possible embodiment of a slip-ring and commutator disc 28 of a rotating field generating device 01 which can provide the required current supply sequence to a single-pole synchronous motor. With regard to the description of the basic components of the slip-ring and commutator disc 28, reference is made to the description of FIG. 10. Compared to the general view in FIG. 10, FIG. 15 shows a possible connection of the DC slip-rings 34 to the commutator segments 06. In this connection, the commutator 32 is split into four commutator segments 06. These commutator segments 06 comprise a positive pole segment 40 which is connected in electrically conducting manner via a DC commutator connection 43 via the PCB module unit 04 to the positive pole slip-ring 34 with the DC brush unit 08a. Correspondingly, a negative pole segment 41 is connected in electrically conducting manner via a DC commutator connection 43 via the PCB module unit 04 to the negative pole slip-ring 34 with DC brush unit 08b. The two direct current segments 40, 41 are connected via two corresponding flyback diode circuits 44 to the remaining two commutator segments 42. The commutator segments 42 are used to interrupt the current supply to the respective motor winding, the rotating field brush unit 09 of which passes over the commutator segments 42, where the flyback diodes 44 serve in the currentless state of the motor winding to discharge the magnetic energy stored in the motor winding. It must be noted that in the embodiment shown the angular extent ccs of a commutation segment 42 is $\phi_{cs}=30°$. The width of the segment 42 can however be altered in particular when commutation problems occur, and in particular widened. The commutation segment 42 must have at least the width $L_B$ of a brush of a rotating field brush unit 09, in general however the brush size is considerably less than the angular longitudinal extent of the commutation segments 42.

Accordingly, in a slip-ring and commutator disc of a 2-pole synchronous motor (6 motor windings) an adapted commutator segmentation can be provided. The design of a rotating field generating device for an n-pole synchronous motor can be achieved by adapting the angular lengths of the individual commutator segments 42 by the angular extents $\phi_{cs}=\pi/(6n)$ and accordingly the angular extents of the (several) positive and negative pole segments 40, 41 by $5\pi/(6n)$. By means of this adaptation of the rotating field generating device, synchronous machines with any number of poles can be used within the scope of a pitch drive device in accordance with the invention to generate any required speeds and drive forces for an emergency operation.

In addition, an adaptation of the speed of the pitch drive device by using a transmission is conceivable, so that for variable speeds both the synchronous motor and the rotating field generating device do not have to be adapted.

The invention claimed is:

1. Pitch drive device for a wind power or hydroelectric power station comprising:
 a synchronous motor and a motor operation switchover unit for switching between normal operation and emergency operation, such that the synchronous motor is operable in normal operation using an AC supply and in emergency operation using a DC supply;
 the synchronous motor comprising a stator, a shaft and a rotating field generating device for generating a rotating field from the DC supply for a rotating stator magnetic field of the stator of the synchronous motor;
 the rotating field generating device being in electrical contact with the stator and the rotating field generating device is being a mechanical rotating field generating device that can be connected to the shaft of the synchronous motor; wherein
 the rotating field generating device comprising a DC transmission unit and a rotating field transmission unit;
 the DC transmission unit comprising two annular or circular DC slip-rings rotatable with the motor shaft and two fixed DC brush units; and
 the rotating field transmission unit comprising a multipolar annular or circular rotatable commutation unit having commutator segments and a plurality of angularly offset and fixed rotating field brush units,
 where in emergency operation the direct current is transformed by the DC transmission unit and by the rotating field transmission unit to a rotating alternating current for supplying the stator.

2. The device according to claim 1, wherein the rotating field generating device comprises a slip-ring and commutator disc rotating centrically with the rotor axis of the synchronous motor, where the DC transmission unit and the rotating field transmission unit are arranged in a circular ring form and radially spaced from one another on at least one end face of the slip-ring and commutator disc and where the DC brush unit and rotating field brush unit are aligned in a direction parallel to the rotor axis and passing over the end face of the slip-ring and commutator disc.

3. The device according to claim 2, wherein a PCB module unit is arranged in electrical contact with the DC and rotating field transmission units at least on one end face of the slip-ring and commutator disc, in particular in rotationally symmetrical manner to the disc axis, where the PCB module unit comprises passive and/or active electrical operating means for assisting the commutating process.

4. The device according to claim 2, wherein the slip-ring and commutator disc is mounted in co-rotating and axially movable manner on the motor shaft and is connectable to the fixed DC and rotating field brush units in emergency operation and disconnectable in normal operation by means of a coupling device activatable by the direct current supplying the rotating field generating device.

5. The device according to claim 1, wherein the rotating field generating device is comprised in a braking device of the synchronous motor.

6. The device according to claim 1, wherein the motor operation switching unit comprises a normal operation switchover unit for an AC or three-phase AC normal operation of the synchronous motor, in particular for an AC inverter operation, and an emergency operation switchover device for a DC emergency operation of the synchronous motor, in particular for a DC operation in which the stator rotating field can be generated by the rotating field generating device.

7. The device according to claim 6, wherein at least the emergency operation switchover device can switch on the electrical current supply line between the rotating field transmission unit and the stator.

8. The device according to claim 1, wherein the rotor of the synchronous motor is a separately excited rotor, where the current supply to the rotor winding can be achieved via the DC transmission unit of the rotating field generating device.

9. A method for operating a pitch drive device according to claim 1, wherein in a normal operation the synchronous motor is operated to set a rotor blade pitch of a rotor blade of a wind power or hydroelectric power station by means of an AC or three-phase AC supply, wherein the synchronous motor is operated by means of a DC supply in an emergency operation.

10. The method according to claim 9, wherein when an emergency situation occurs, in particular when an inverter unit supplying the synchronous motor or a main supply fails, the motor operation switchover unit switches from an AC normal operation, where the stator of the synchronous motor is in particular directly connected via the motor operation switchover unit to the inverter unit to generate a stator rotating field, to a DC emergency operation in which the stator is connected to a DC emergency operation control and supply device for generating a stator rotating field with interposition of the rotating field generating device and via the motor operation switchover unit.

11. The device according to claim 3, wherein the slip-ring and commutator disc is mounted in co-rotating and axially movable manner on the motor shaft and is connectable to the fixed DC and rotating field brush units in emergency operation and disconnectable in normal operation by means of a coupling device activatable by the direct current supplying the rotating field generating device.

12. The device according to claim 1, wherein the AC supply comprises a three-phase AC supply and the rotating field transmission unit comprises three angularly offset and fixed rotating field brush units.

\* \* \* \* \*